(12) United States Patent
Buendgen et al.

(10) Patent No.: US 12,271,469 B2
(45) Date of Patent: Apr. 8, 2025

(54) EXTENDING SECURE GUEST METADATA TO BIND THE SECURE GUEST TO A HARDWARE SECURITY MODULE

(71) Applicant: International Business Machines Corporation, Armonk, NY (US)

(72) Inventors: Reinhard Theodor Buendgen, Tuebingen (DE); Jonathan D. Bradbury, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 18/159,263

(22) Filed: Jan. 25, 2023

(65) Prior Publication Data
US 2024/0176870 A1    May 30, 2024

(30) Foreign Application Priority Data

Nov. 29, 2022 (GB) ...................................... 2217870

(51) Int. Cl.
| | |
|---|---|
| G06F 21/53 | (2013.01) |
| G06F 21/31 | (2013.01) |
| G06F 21/60 | (2013.01) |

(52) U.S. Cl.
CPC ............. *G06F 21/53* (2013.01); *G06F 21/31* (2013.01); *G06F 21/602* (2013.01)

(58) Field of Classification Search
CPC ........ G06F 21/53; G06F 21/31; G06F 21/602; G06F 21/575; G06F 2009/45587
See application file for complete search history.

(56) References Cited

U.S. PATENT DOCUMENTS

| | | | |
|---|---|---|---|
| 11,023,619 | B2 | 6/2021 | Buendgen |
| 11,475,167 | B2 | 10/2022 | Buendgen |
| 11,500,988 | B2 | 11/2022 | Buendgen |
| 11,533,174 | B2 | 12/2022 | Buendgen |
| 2016/0149877 | A1 | 5/2016 | Kancharla |

(Continued)

OTHER PUBLICATIONS

PCT/EP2023/082297, Notification of Transmittal of the International Search Report and the Written Opinion of the International Searching Authority, or the Declaration, Date of Mailing: Feb. 7, 2024, 12 pages.

(Continued)

*Primary Examiner* — El Hadji M Sall
(74) *Attorney, Agent, or Firm* — Kelsey M. Skodje (57) ABSTRACT

A method, system, and computer program product implement a three-factor authorization in a trusted computing environment. The method includes triggering, by a hypervisor, a start of a secure guest by passing control regarding an image of the secure guest and metadata of the secure guest to a trusted firmware, where the secure guest is designed to access a hardware security module (HSM). Upon a successful integrity check of the metadata of the secure guest by the trusted firmware, the secure guest is started using the hypervisor and any sensitive request from the secure guest to the HSM is blocked. The secure guest submits a request with a request structure including a third authorization secret and a characterization of a requested HSM to the trusted firmware. The method also includes binding each HSM protected key generated in the requested HSM in response to the request to the third authorization secret.

25 Claims, 9 Drawing Sheets

(56) References Cited

U.S. PATENT DOCUMENTS

| | | |
|---|---|---|
| 2016/0241393 A1 | 8/2016 | Boenisch et al. |
| 2018/0212966 A1* | 7/2018 | Costa ...................... H04L 63/10 |
| 2020/0076607 A1 | 3/2020 | Allen |
| 2020/0089916 A1 | 3/2020 | Buendgen |
| 2020/0159940 A1 | 5/2020 | Werner |
| 2020/0285746 A1 | 9/2020 | Buendgen |
| 2020/0285748 A1 | 9/2020 | Buendgen |
| 2021/0232709 A1 | 7/2021 | Buendgen |
| 2021/0234681 A1 | 7/2021 | Buendgen |
| 2022/0108026 A1* | 4/2022 | Ortiz ................... G06F 12/1441 |
| 2022/0222357 A1 | 7/2022 | Buendgen |
| 2023/0195490 A1* | 6/2023 | Gomes .................. G06F 21/602 718/1 |

OTHER PUBLICATIONS

Intellectual Property Office, "Patents Act 1977: Search Report under Section 17(5)", May 17, 2023, 3 pages, GB Application No. 2217870.1.

\* cited by examiner

EXTENDING SECURE GUEST METADATA TO BIND THE SECURE GUEST TO A HARDWARE SECURITY MODULE

BACKGROUND

The present disclosure relates generally to a computer-implemented security method in a trusted computing environment, and more specifically, to implementing a three-factor authorization to control use of a key that is protected by a hardware security module (HSM) and generated by a secure guest in a trusted computing environment.

The security of data and communication channels is a priority for the management of corporate IT (information technology). Data protection and the provision of secure computing platforms involve both software and hardware modules. In trusted computing environments, cryptographic keys used by virtual machines (also denoted as guests) or software containers running on/in hypervisors can practically not be accessed by the hypervisor or related software management and configuration programs. Nevertheless, also in such computing environments, breaches of the fundamental security rules, such as an exposure of a secret key or usage of a secret key for a secure guest image through the hypervisor, continue to be possible. Hence, there is a need to address these open problems.

SUMMARY

Embodiments of the disclosure are directed to a computer-implemented method for implementing a three-factor authorization to control use of a key that is protected by a hardware security module and generated by a secure guest in a trusted computing environment. The method includes triggering, by a hypervisor, a start of a secure guest by passing control regarding an image of the secure guest and respective metadata to a trusted firmware, where the secure guest is designed to access a hardware security module. Upon a successful integrity check of the secure guest metadata by the trusted firmware, the method includes starting the secure guest using the hypervisor, and blocking any sensitive request from the secure guest to the hardware security module. The secure guest submits a request with a request structure including a third authorization secret and a characterization of a requested HSM to the trusted firmware. The method also includes binding each HSM protected key generated in the requested HSM in response to the request to the third authorization secret.

The disclosed method for implementing a three-factor authorization may offer multiple advantages, technical effects, contributions and/or improvements. For example, the method may enable greater security of confidential computing environments by preventing access credentials for one secure guest to be used by another secure guest.

Further embodiments are directed to a system, which includes a memory and a processor communicatively coupled to the memory, wherein the processor is configured to perform the method. Additional embodiments are directed to a computer program product, which includes a computer readable storage medium having program instructions embodied therewith, the program instructions executable by a processor to cause a device to perform the method.

BRIEF DESCRIPTION OF THE DRAWINGS

Embodiments of the disclosure are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject matter, also any combination between features relating to different subject matter, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Preferred embodiments of the present disclosure will be described, by way of example only, and with reference to the following drawings.

DETAILED DESCRIPTION

The security of data and communication channels still continues to have one of the highest priorities for the management of corporate IT (information technology). This is not only necessary due to government regulations (e.g., European Union (EU) General Data Protection Regulation), but also due to a loss of credibility among companies in not being able to reliably protect customer data at all times—and in order to avoiding loss of sales and profits—in the event of compromised customer data records. It turns out that data protection and the provision of secure computing platforms is not just a software issue, it also involves hardware modules. This may not yet be a natural environment for mass-market chips used in microcontrollers, personal computers, mobile phones or home automation devices. However, for highly trusted enterprise-class computing environments, such as those used in the financial, insurance, or government industries, it is essential to be able to demonstrate that, from a technological perspective, data breaches have a very high probability of being prevented. This may require some additional high-tech components and supporting processes. However, the associated success in terms of data security pays off for the additional effort.

These thoughts are also applicable to trusted computing environments in which cryptographic keys used by virtual machines (also denoted as guests) or software containers running on/in hypervisors can practically not be accessed by the hypervisor or related software management and configuration programs. Nevertheless, also in such computing environments, breaches of the fundamental security rules, such as an exposure of a secret key or usage of a secret key for a secure guest image through the hypervisor, continue to be possible. This may also be possible in environments in which hardware security modules (HSMs) have been in use for quite some time.

Existing techniques for implementing three-factor authentication to have control using an HSM protected key generated by secure guests in a trusted computing environment can include securely maintaining the HSM protected key on a virtual computer system by configuring a specialized virtual machine to manage and maintain the secret on behalf of an application. When the application requests access to the secret, a controlling domain, in combination with the specialized virtual machine, validates that the application is authorized to make the request and that the application has not been compromised prior to making the request.

Known problems in such environments can be identified in the context of performing a master key roll or a local key re-encryption while the software component using the encrypted keys continue to be executed. Furthermore, the master key used to encrypt local keys may be stored in multiple redundant HSMs which are accessible by the software component. Technologies such as openCryptoki or CCA (Common Cryptographic Architecture) cannot yet fully meet this requirement.

None of these existing approaches can reliably protect completely against unauthorized exposures of secrets or a use of a secret for the wrong non-authorized guest image. Hence, there is a need to address these open problems.

In the context of this description, the following technical conventions, terms, and/or expressions may be used:

The term "three-factor authorization" may denote a procedure under which access to a computer system resource may only be granted if three conditions are met independently from each other. Widely known is the two-factor authorization for online banking, where a user enters a user name and passphrase and receives an additional security code via a smartphone, e.g., to be entered via browser. This concept may be enhanced by a third independent component to make access to system resources significantly more secure.

The term "key protected by a hardware security module" may denote that an encryption of the protected key may only be possible using a master key from a hardware security module. Thereby, the access to the hardware security module may only be possible to avoid trusted firmware.

The term "secure guest" may denote a virtual machine or a software container comprising executable program code in a secure computing environment that is protected by a trusted execution environment such that no non-trusted component of a computer system can observe any state (memory or registers) of the running secure guest. Typical non-trusted components are software hypervisors, hardware management consoles, and other guests.

The term "trusted computing environment" may denote a computing environment in which a hypervisor on any system management software having a user interface component may access or intercept a virtual machine, and, in particular, using encryption or decryption keys.

The term "hypervisor" may denote a well-defined type of computer software or firmware that creates and runs virtual machines or software containers. Hence, a plurality of virtual machines/software containers may be executed in parallel without any risk of cross references. An error in the virtual machines may not cause any harm to another virtual machine. Each virtual machine may own a defined address room.

The term "image of the secure guest" may denote one or more files comprising an executable software component to be executed as a secure guest using a hypervisor.

The term "metadata" may denote—in the classical sense, information about data-here, in particular, data required to start a virtual machine. Such information may be used by the trusted firmware in order to start a virtual machine, e.g., may contain integrity measures of an image of a secure guest or keys needed to decrypt the image of a secure guest. These metadata may, e.g., comprise resources required, interfaces required, performance required and—in some cases—also which security measures are appropriate. The extension of the metadata and the proposed concept may be the additional secret key used by the trusted firmware and handed over, e.g., by the hypervisor starting before the virtual machine (or software container) is started or by the running secure guest.

The term "trusted firmware" (trusted FW or TFW) may denote a component deeply embedded into the hardware of the computing (mainframe) system which may not be accessed by any other user controlled software. The trusted firmware may have predefined and highly secured application programming interfaces in order to protect—in a broad sense—the functioning of the trusted firmware. The trusted FW should be seen more as a deeply integrated component of the computer system instead of a service component. Communication channels to/from the trusted firmware are typically cryptographically protected.

In the context of confidential computing, the trusted firmware may implement the trusted execution environment (TEE). An example of a trusted computing environment is the Ultravisor of Secure Execution® for Linux® feature of IBM Z® systems.

The term "integrity check" may denote ensuring that the component—in particular, request structure—may be consistent in itself. For this, typically hash value comparisons, digital signatures, or message authentication codes (MACs) may be used.

The term "blocking any sensitive request" may denote the denial to forward or execute any request requiring a special protection/encryption of exchange information.

The term "request structure" may denote a data structure describing details used as part of a request for a binding between a secure guest and a specific, selected hardware security module. This request structure may be integrity protected and may be partially encrypted, where the encrypted part may also comprise the third authorization secret. It may be decrypted using a key that is only accessible to the trusted firmware and stored in a dedicated storage area of the trusted firmware for further usage.

The term "third authorization secret" may denote the third component for a three-factor authentication protocol. In the context of this disclosure, the first factor may be credentials to get access to a secure guest (e.g., user-ID and password) and the second factor may be an access path to a specific hardware security module.

The term "integrity protected" may denote that a data structure may have an inherent consistency structure and has not been tampered with since its creation, i.e., integrity which can be checked/verified, e.g., using hash values, digital signatures, or MACs.

The term "hardware security module" (HSM) may denote a hardware element being connected to or integrated into a computer system, e.g., a server system, e.g., here, a manufacturing-side server computer. The HSM is designed to be tamper proof, and to protect a secret, i.e., a software key against unauthorized access, even against physical penetration and/or unscheduled physical de-plugging. The HSM may be closely linked to a CPU or may be operated independently of the CPU. In other words, an HSM is a physical computing device that safeguards and manages one or more digital keys for strong authentication and provides crypto-processing. These modules traditionally may come in the form of a plug-in card or an external device that may be attached directly to a computer or network server.

The term "extension secret" may denote a secret that, when it is part of or is derived from a secret in the metadata, may ensure that only the creator of the metadata can create request structures to modify (e.g., extend) the metadata.

The term "binding a hardware security module protected key to a secret" may mean an integrity protected indication being part of a hardware security protected key such that this key can be considered valid by the hardware security module if the trusted firmware, and possibly the hardware security module, has access to the secret.

In the following, a detailed description of the figures will be given. All instructions in the figures are schematic. Firstly, a flowchart of an embodiment of the computer-implemented method for implementing a three-factor authorization to control use of a key that is protected by a hardware security module and generated by a secure guest in a trusted computing environment is given. Afterwards, further embodiments, as well as embodiments of the security system for implementing a three-factor authorization to control use of a key that is protected by a hardware security module and generated by a secure guest in a trusted computing environment will be described.

Figure 1:
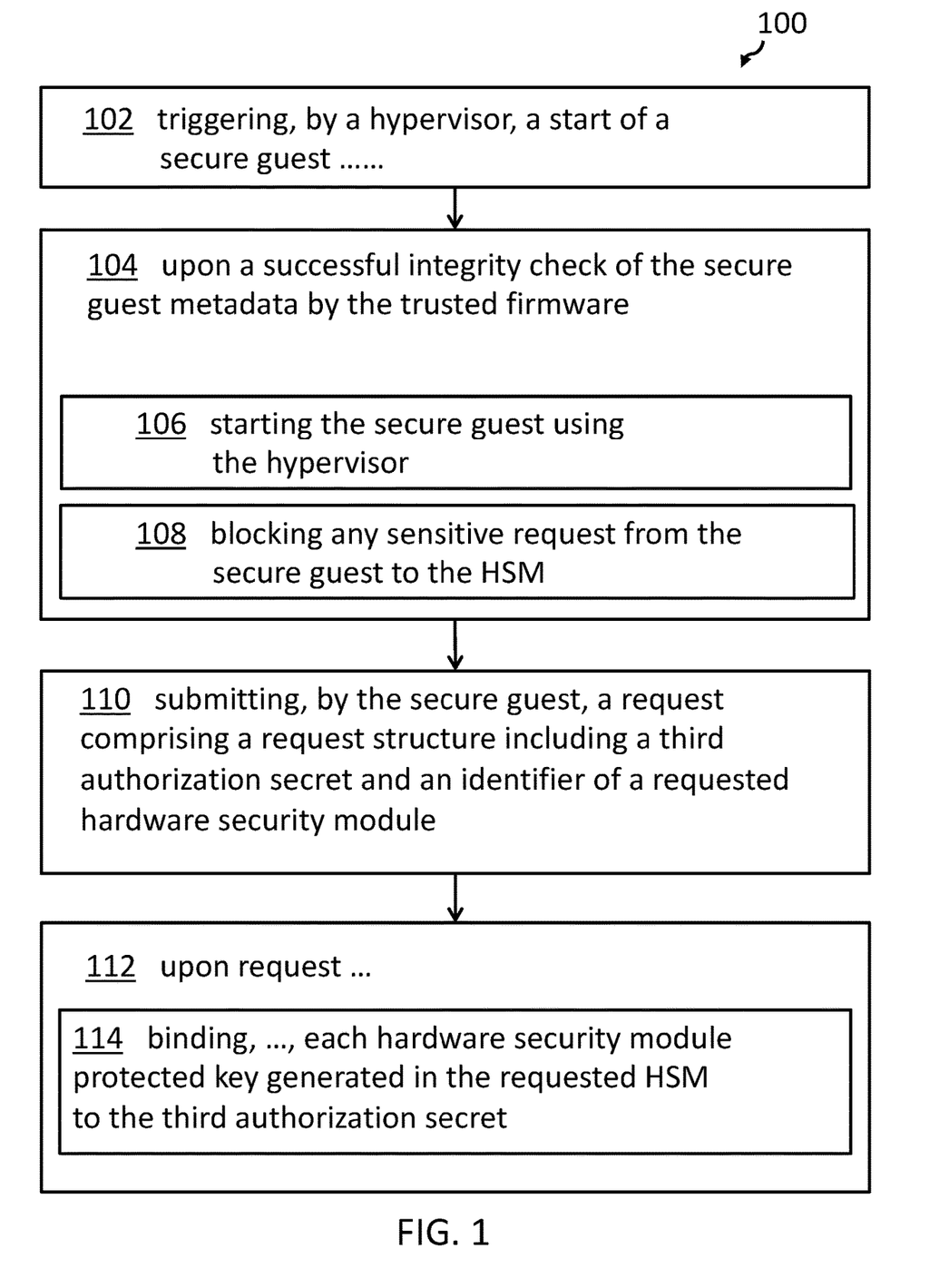
FIG. 1 is a flowchart illustrating a method of implementing a three-factor authorization to control use of a key that is protected by a hardware security module and generated by a secure guest in a trusted computing environment, according to some embodiments.

FIG. 1 is a flowchart illustrating a method of implementing a three-factor authorization to control use of a key that is protected by a hardware security module and generated by a secure guest in a trusted computing environment, according to some embodiments. The secure guest may, e.g., comprise a virtual machine or a software container—or simply container-comprising executables of the code.

The method 100 includes triggering 102, by a hypervisor, a start of a secure guest by passing control regarding an image of the secure guest and respective metadata to a trusted firmware, where the secure guest is designed to access a hardware security module.

The method 100 includes also, upon a successful integrity check 104 of the secure guest metadata by the trusted firmware, starting 106 the secure guest using the hypervisor, and blocking 108 any sensitive request from the secure guest to the hardware security module. A later stage of a lifetime of the secure guest the blocking 108 may be released again once the final secure association between the secure guest and the selected hardware security module has been established.

The method 100 also includes submitting 110, by the secure guest, a request comprising a request structure including a third authorization secret—i.e., third factor—and characterization of a requested hardware security module to the trusted firmware, as well as an advantageous exclusively binding 114 by the trusted firmware. Each hardware security module protected key is generated in the requested hardware security module upon a request 112 by the secure guest to the third authorization secret. After this binding 114, the virtual secure guest should now be enabled to submit sensitive crypto request to the requested HSM; i.e., such requests are no longer blocked.

Figure 2:
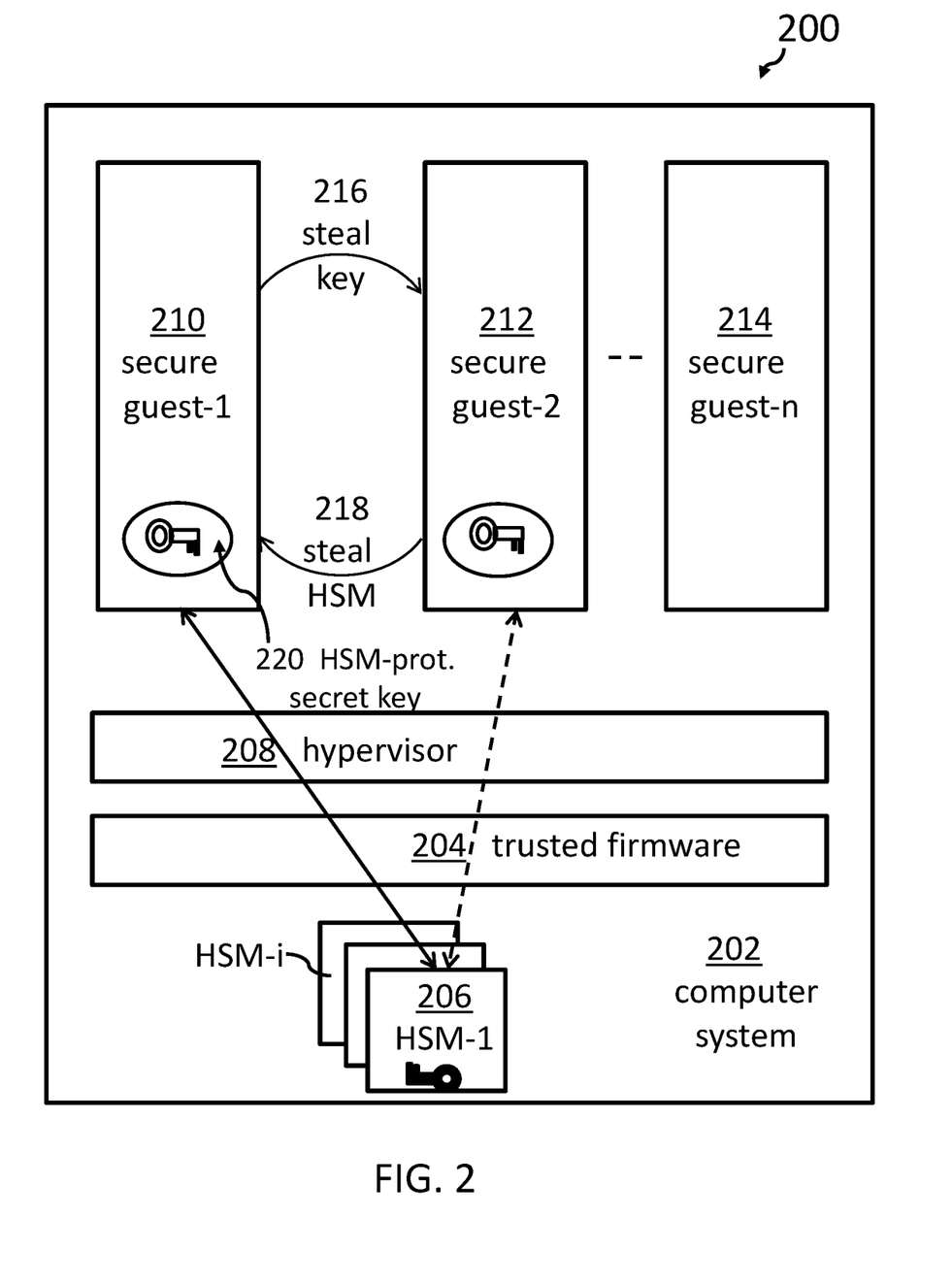
FIG. 2 is a block diagram illustrating an example of a security threat, according to some embodiments.

FIG. 2 is a block diagram 200 illustrating an example security threat when using trusted firmware and/or the security module, according to some embodiments. All components are preferably executed as part of the computer system 202. Very closely related to the computer system 202, as such, is the trusted firmware 204, which cannot be changed by a user of the computer system and which is installed and enabled during the production of the computer system 202.

Additionally, one or more hardware security modules HSM-1 to HSM-I 206 can be components of the computer system 202. Here, e.g., an HSM key to be used to protect HSM protected keys may be stored and can only be accessed using clearly defined and strict access procedures.

A next layer of the stacked architecture is represented by the hypervisor 208 which enables the hypervisor 208 to execute guests 210, 212, 214, e.g., virtual machines or containers comprising executables of the code. Secure guest-1 210 can, for example, maintain a security key which may be protected by the master key managed by the HSM 206. However, in a situation where the HSM protected (HSM-prot.) secret key 220 may be exposed so that the secure guest-2 212 may have access to it, i.e., by stealing, 216, that key, and where also an HSM binding to a specific HSM-1 206 is stolen, 218, by reconfiguring the HSM access from secure guest-1 210 to secure guest-2 212, the secret key 220 can be misused by the secure guest-2 212, i.e., for the wrong guest image.

Figure 3:
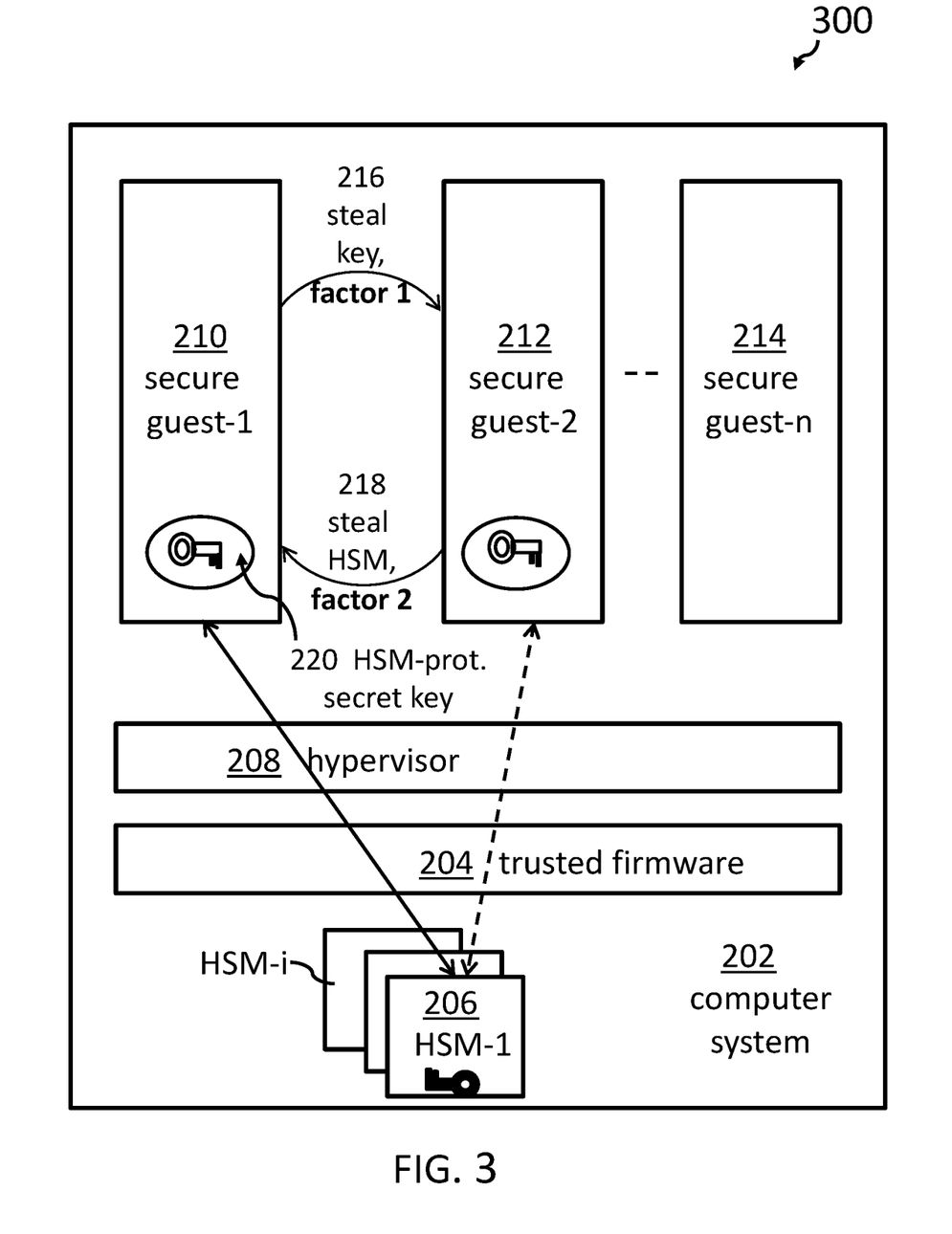
FIG. 3 is a block diagram illustrating an example of two-factor authorization in a trusted computing environment, according to some embodiments.

FIG. 3 is a block diagram 300 illustrating how a two-factor authentication works in trusted computing environments, according to some embodiments. The main components are here the same as in FIG. 2. FIG. 3 only illustrates in which way the first security factor and the second security factor have been stolen (respectively, 216 and 218) by the secure guest-2 212 in order to wrongly access HSM-1 206.

Figure 4:
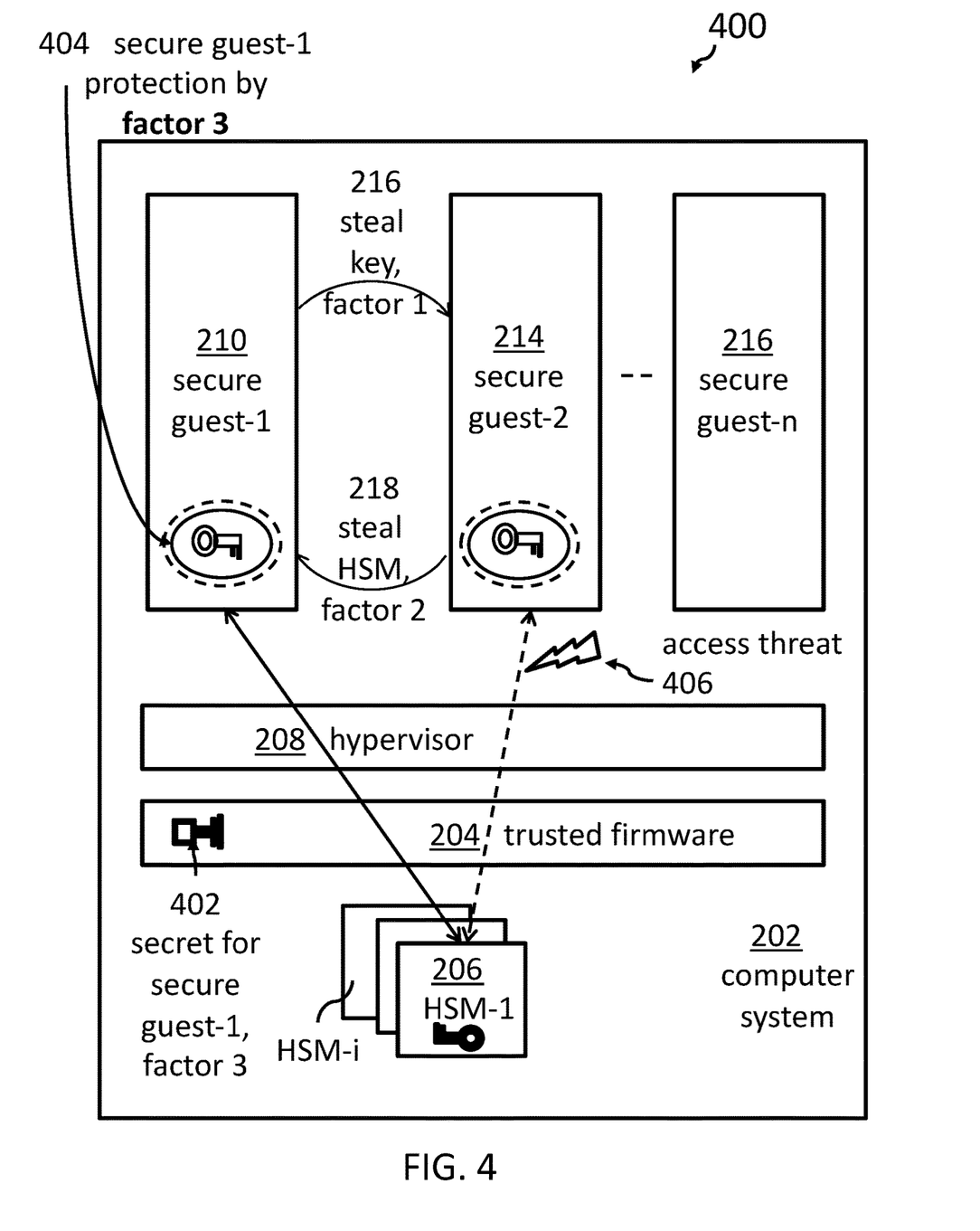
FIG. 4 is a block diagram illustrating an example of three-factor authorization in a trusted computing environment, according to some embodiments.

FIG. 4 is a block diagram 400 illustrating a three-factor authentication for a trusted computing environment, according to some embodiments. With the third authentication factor, the above-described threat can be avoided successfully. The key inside secure guest-1 210 is now protected by another protection shield, i.e., the third authorization factor (factor 3) 404 so that secure guest-1 is protected by this third factor. In order to access this protection mechanism, the secret 402 is loaded to the trusted firmware 204 for secure guest-1 at the time of initializing secure guest-1 210 as additional metadata of the secure guest-1 210.

Such additional protection can be enabled for each secure guest (secure guest-2, secure guest-n), as shown with the additional dashed line surrounding the security key of secure guest-2 214. This way, an access threat 406 from stolen keys and HSM bindings belonging to secure guest-1 210 by secure guest-2 214 can be stopped altogether. This stealing, 216, of the key representing authentication factor 1 and the stealing 218 of the HSM binding representing authentication factor 2 is now no longer sufficient to wrongly establish a binding of secure guest-2 214.

Figure 5:
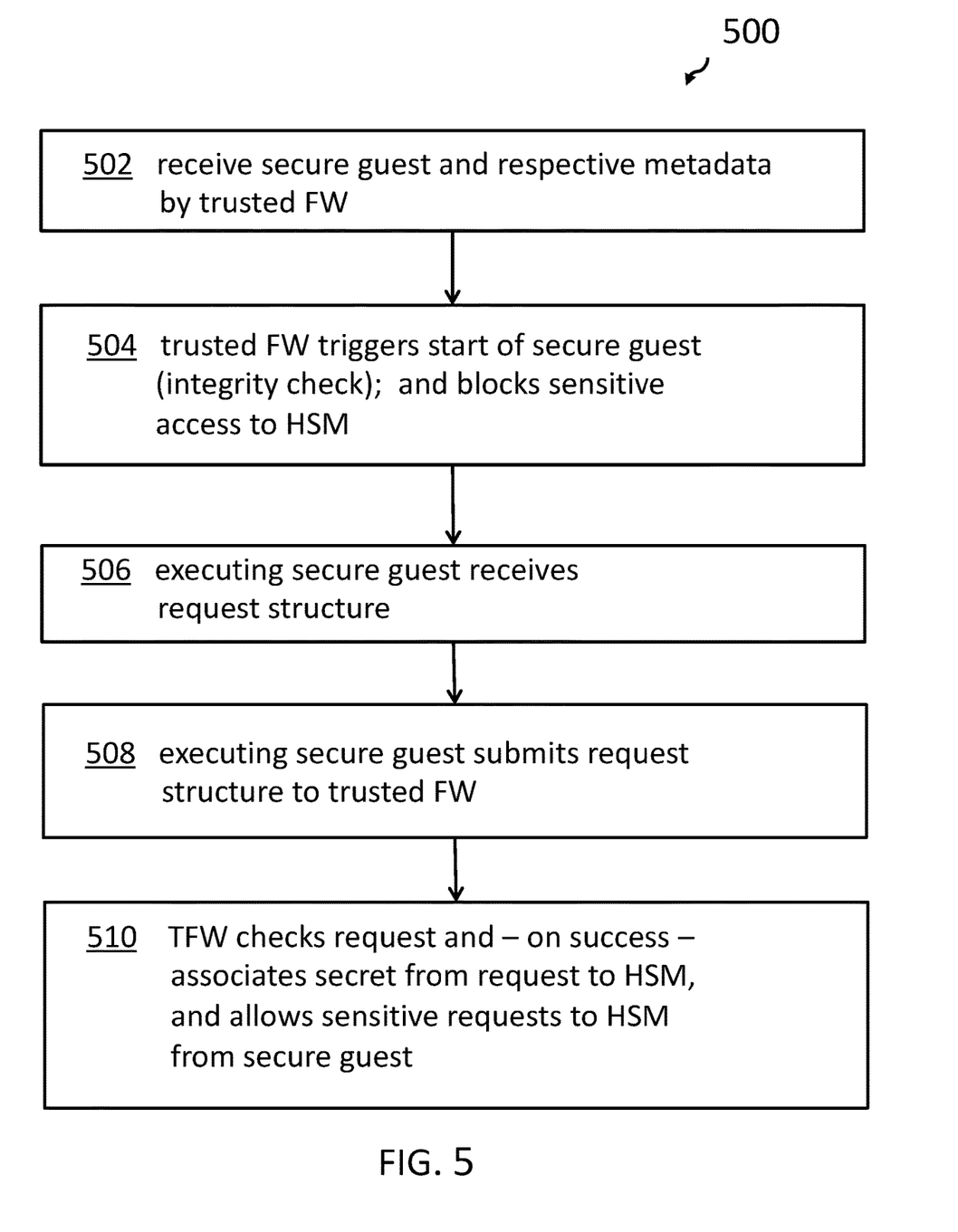
FIG. 5 is a flowchart illustrating operations that may be included in the method of implementing the three-factor authorization, according to some embodiments.

FIG. 5 is a flowchart 500 illustrating additional and optional steps for the method 100 illustrated in FIG. 1, according to some embodiments. These additional activities can be executed together with, or as an extension of, the flowchart described in the context of FIG. 1. They also do not need to be executed in the sequence shown. They may be executed before, in parallel, or after some of the steps, according to FIG. 1.

These additional steps comprise receiving 502 an image of the secure guest and respective metadata by the hypervisor, the trusted firmware, respectively. Then, the trusted firmware can trigger 504 a start of the secure guest, provided an integrity check, as described above, has been performed. At this early stage of the execution of the secure guest, any sensitive access of the secure guest to an HSM is blocked. In a further step, the executing secure guest receives 506 a request structure, e.g., from an operator or user of the secure guest or a respective program. Then, the executing secure guest can submit 508 the request structure to the trusted firmware. Next, the trusted firmware (TFW) integrity-checks 510 the request, and, on a successful check, the respective HSM and the secret as part of the request are associated to each other. From this time onward, sensitive requests (e.g., crypto-requests) from the respective secure guest to the corresponding HSM are now allowed and no longer blocked. Hence, the protocol has been executed completely.

Figure 6:
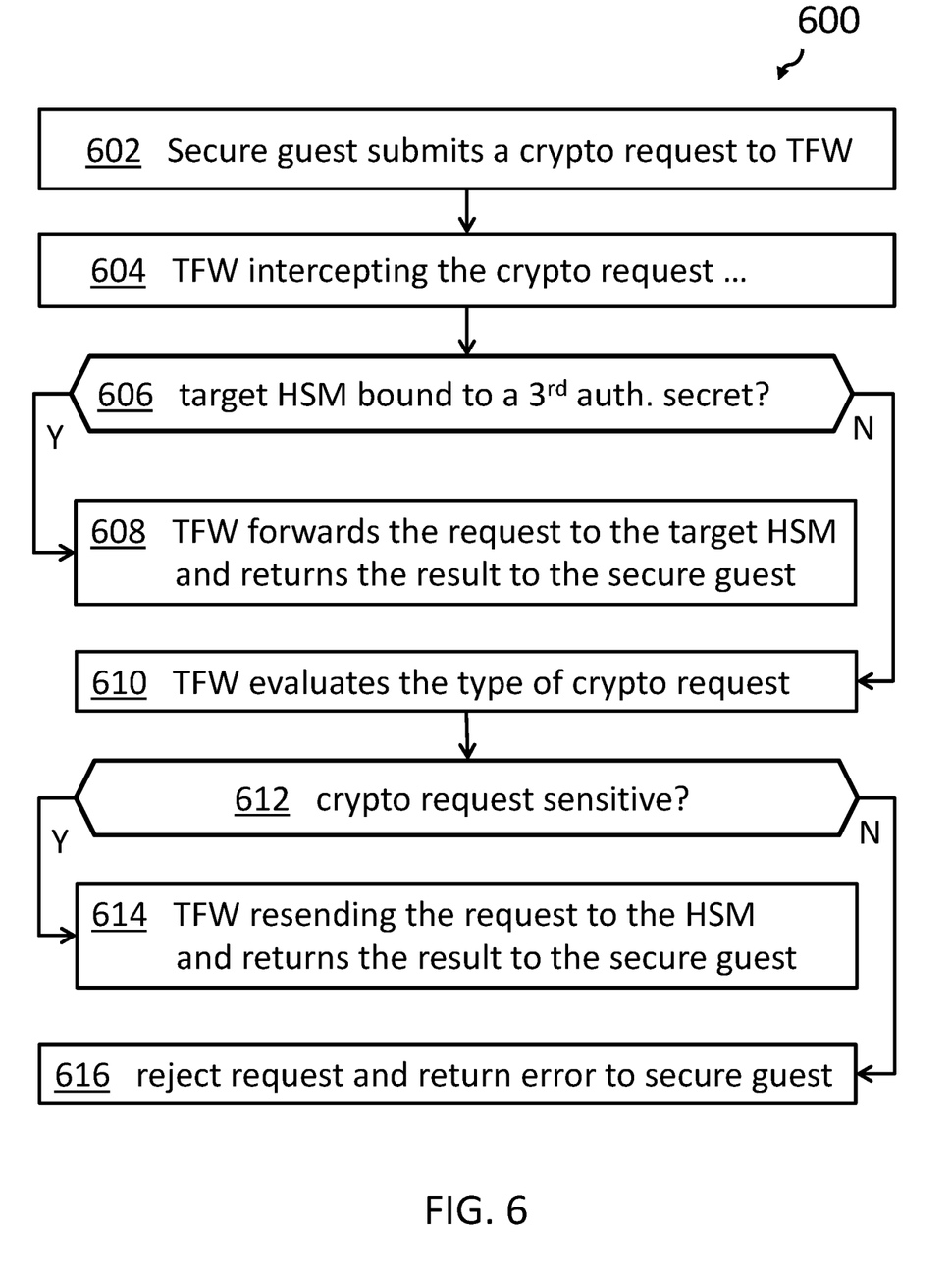
FIG. 6 is a flowchart illustrating further operations that may be included in the method of implementing the three-factor authorization, according to some embodiments.

FIG. 6 is a flowchart illustrating a process 600 that includes the proposed security method 100 under another aspect and with more details, according to some embodiments. In particular, the blocking and evaluating of a crypto request is detailed. The process 600 starts with the secure guest submitting 602 a crypto request to the trusted FW. After receiving the crypto request, the trusted FW intercepts 604 the crypto request for the hardware security module (i.e., target HSM) from the secure guest. Then, a determination 606 is performed whether the target HSM is bound to (or associated with) a 3rd authorization secret. If that is the case-case "Y"—the trusted FW forwards 608 the request to the HSM and returns the result to the secure guest.

If that is not the case—case "N"—i.e., if the target HSM is not bound to (or associated with) a 3rd authorization secret, the trusted FW evaluates 610 the type of crypto request.

If it is determined 612—case "Y"—that the type of crypto request is sensitive, then the trusted FW resends 614 the request to the HSM-optionally after possible modifications based on the $3^{rd}$ authorization secret—and returns the result to the secure guest— also optionally after possible modifications based on the $3^{rd}$ authorization secret. Otherwise—case "N"—the trusted FW rejects 616 the request and returns an error to the calling guest. Hence, no unauthorized secure guest can successfully perform a crypto request if the intercepting trusted FW determines that no association exists between the requesting secure guest and the requested HSM.

Figure 7:
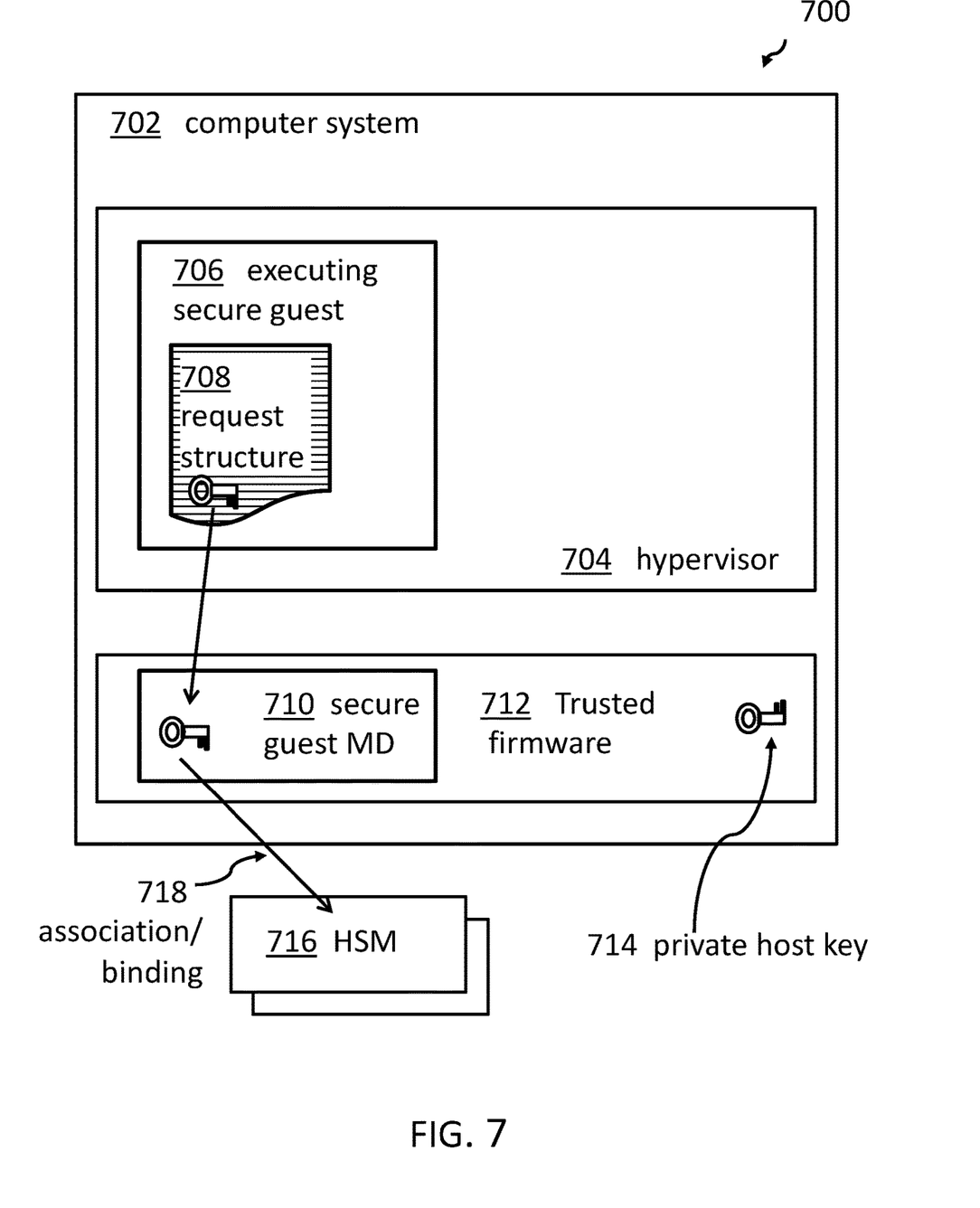
FIG. 7 is a block diagram illustrating a computing environment for implementing a three-factor authorization, according to some embodiments.

FIG. 7 is a block diagram illustrating components 700 for carrying out process 100 with relationships to each other, according to some embodiments. The above-described functions and operations may happen in the context of the computer system 702, e.g., a mainframe computing system. The hypervisor 704 enables the execution of a (running) secure guest 706. The secure guest can be seen as a cloud computing resource for a remote user. The (remote) user may use a tool in the trusted environment of the owner of the resource to generate the request structure 708.

Furthermore, the computing system 702 can also comprise a trusted firmware (FW) 712—and, as part of it-secure trusted metadata comprising secrets for the running secure guest 706. These metadata can be loaded during the start of the secure guest 706.

The request structure 708 is typically encrypted with the help of a public host key (not shown). The counterpart of the public host key is the private host key 714 maintained by the trusted FW. The encrypted request structure 708 comprises a secret key (shown as part of the request structure 708) which can be added to the secure guest metadata 710. The secret key which has become a part of the secure guest metadata (MD) 710 builds the gatekeeper between secure guest and a specific hardware security module (HSM) 716. The arrow between the secret key as part of the secure guest MD 710 and the HSM 716 represents the binding 718 of the executing secure guest 706 and the selected HSM 716, which may be one HSM part of the plurality of HSMs.

Figure 8:
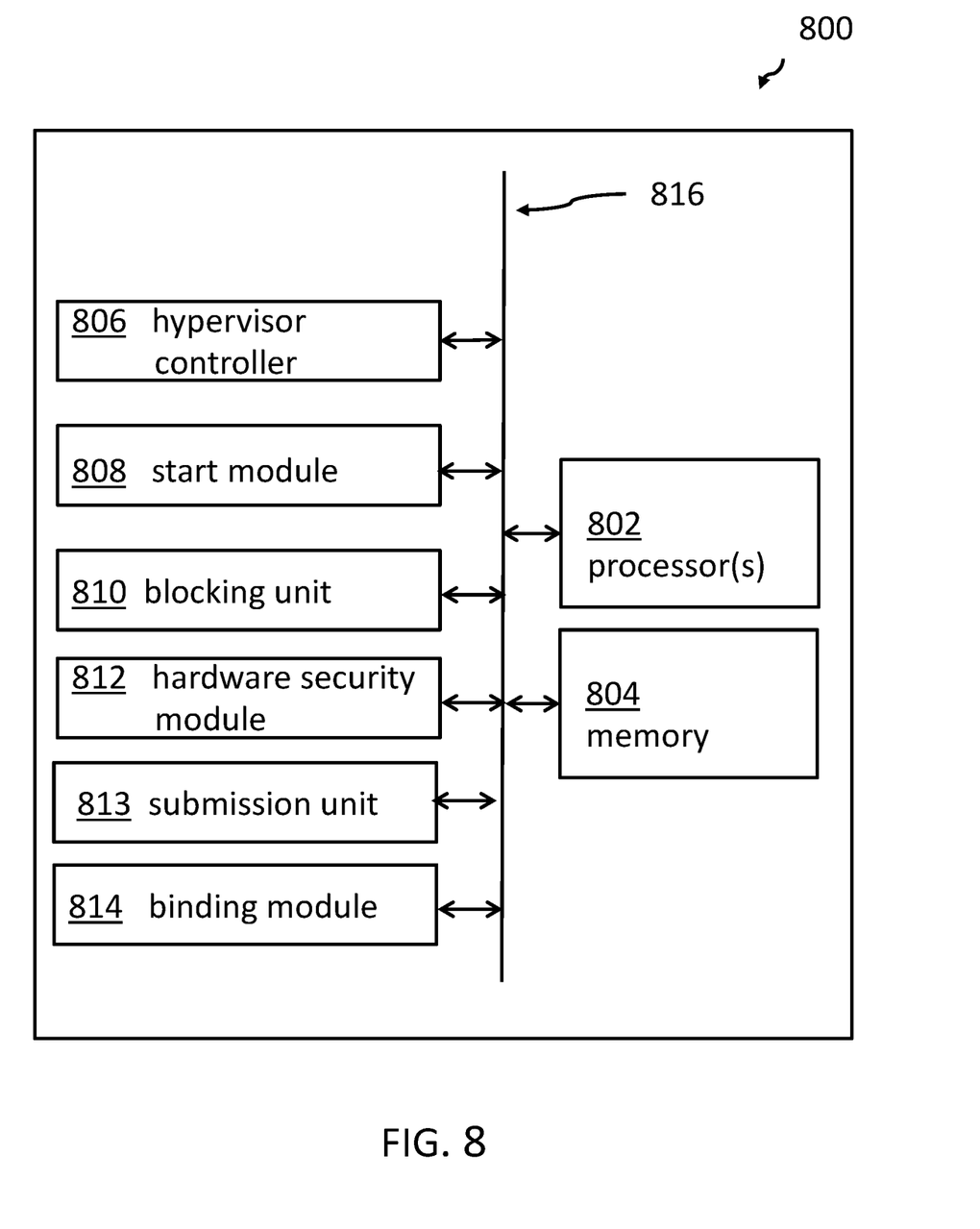
FIG. 8 is a block diagram illustrating a security system, according to some embodiments.

FIG. 8 illustrates a block diagram of an embodiment of a security system 800 for implementing a three-factor authorization to control use of a key that is protected by a hardware security module and generated by a secure guest in a trusted computing environment, according to some embodiments. The system 800 comprises one or more processors 802 and a memory 804 operationally coupled to the one or more processors 802, where the memory 804 stores program portions which, when executed, enable the one or more processors to trigger, by a hypervisor or hypervisor controller 806, a start of a secure guest by passing control regarding an image of the secure guest and respective metadata to a trusted firmware, where the secure guest is designed to access a hardware security module.

The processor 802 is, upon a successful integrity check of the secure guest metadata by the trusted firmware, also enabled to start—e.g., by a start module 808—the secure guest using the hypervisor, and blocking—in particular by a blocking unit 810—any sensitive request from the secure guest to the hardware security module 812.

Additionally, the processor 802 is also enabled to submit—in particular, by a submission unit 813 which may be triggered by the secure guest-a request comprising a request structure including a third authorization secret and an identifier of a requested hardware security module to the trusted firmware, and to bind—in particular by a binding module 814 which can be triggered by the trusted firmware—each hardware security module protected key generated in the requested hardware security module upon a request by the secure guest to the third authorization secret.

All functional units, modules, and functional blocks—in particular the one or more processors 802, the memory 804, the hypervisor controller 806, the start module 808, the blocking unit 810, the hardware security module 812, the submission unit 813, and the binding module 814—may be communicatively coupled to each other for signal or message exchange in a selected 1:1 manner. Alternately the functional units, modules, and functional blocks can be linked to a system internal bus system 816 for a selective signal or message exchange.

Figure 9:
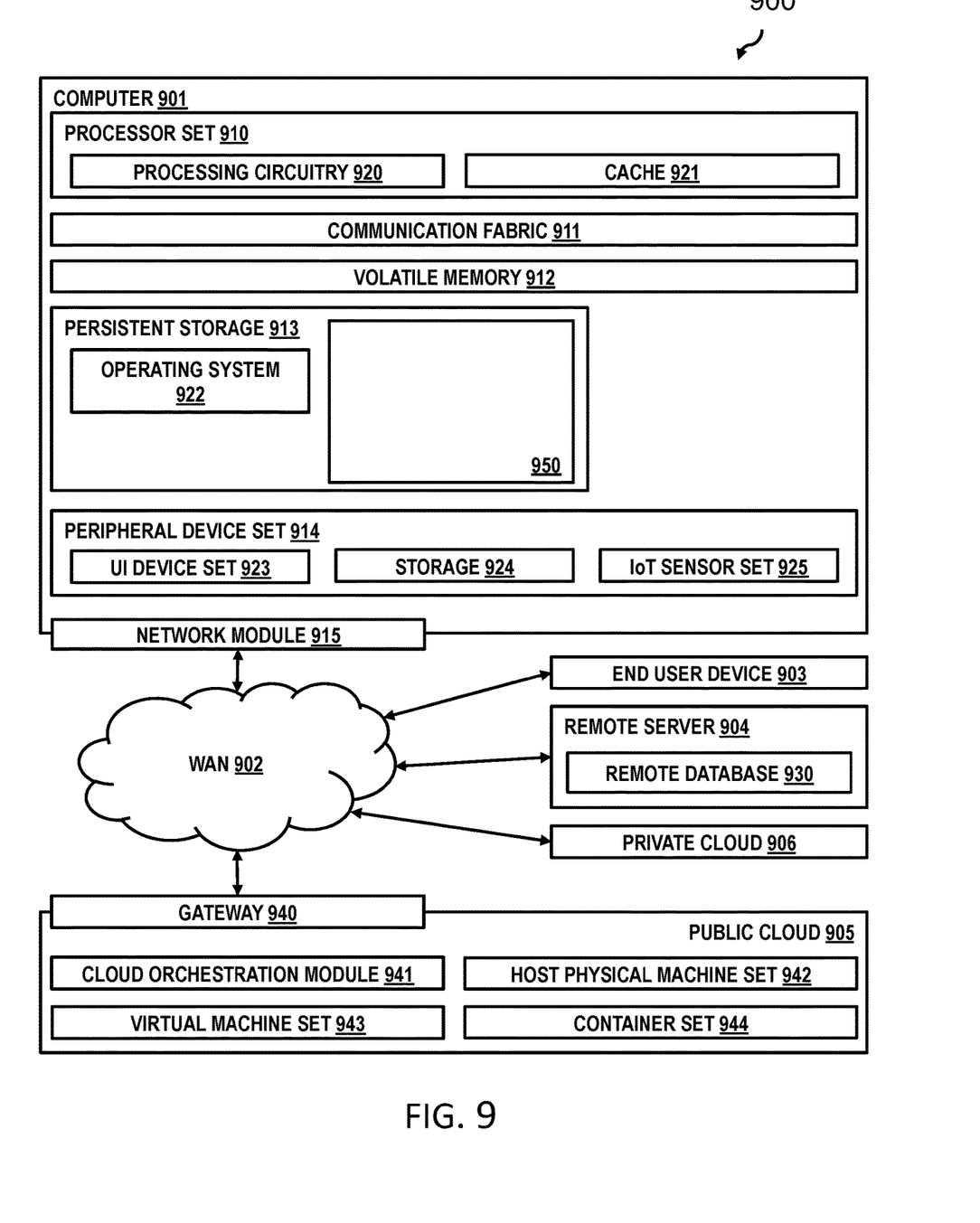
FIG. 9 is a block diagram illustrating a computing environment, according to some embodiments.

FIG. 9 is a block diagram illustrating a computing environment 900, according to some embodiments. Computing environment 900 contains an example of a program logic 950 for the execution of at least some of the computer code involved in performing the inventive methods, such as implementing a three-factor authorization to control use of a key that is protected by a hardware security module and generated by a secure guest in a trusted computing environment.

In addition to block 950, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 950, as identified above), peripheral device set 914 (including user interface (UI), device set 923, storage 924, and Internet of Things (IOT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 950 in persistent storage 913.

COMMUNICATION FABRIC 911 is the signal conduction paths that allow the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, the volatile memory is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface type operating systems that employ a kernel. The code included in block 950 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 923 may include components such as a display screen, speaker, microphone, wearable device (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiment (e.g., embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 806 are both part of a larger hybrid cloud.

It should also be mentioned that the security system 800 for implementing a three-factor authorization to control use of a key that is protected by a hardware security module and generated by a secure guest in a trusted computing environment can be an operational sub-system of the computer 801 and may be attached to a computer-internal bus system.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

What is claimed is:

1. A computer-implemented method for implementing a three-factor authorization in a trusted computing environment, the method comprising:
    triggering, by a hypervisor, a start of a secure guest by passing control regarding an image of the secure guest and metadata of the secure guest to a trusted firmware, wherein the secure guest is designed to access a hardware security module;
    upon a successful integrity check of the metadata of the secure guest by the trusted firmware:
        starting the secure guest using the hypervisor; and
        blocking any sensitive request from the secure guest to the hardware security module;
    submitting, by the secure guest, a request comprising a request structure including a third authorization secret and a characterization of a requested hardware security module to the trusted firmware; and
    binding, by the trusted firmware, each hardware security module protected key generated in the requested hardware security module in response to the request to the third authorization secret.

2. The computer-implemented method according to claim 1, further comprising:
    unblocking sensitive requests to the requested hardware security module from the secure guest that only operates on at least one of the each hardware security module protected key bound to the third authorization secret.

3. The computer-implemented method according to claim 1, further comprising:
    instructing, by the trusted firmware, the hardware security module to bind each key to be generated to the third authorization secret.

4. The computer-implemented method according to claim 1, wherein the request structure is integrity protected and partially encrypted such that only the trusted firmware is enabled to decrypt the encrypted part of the request structure and integrity-check the request.

5. The computer-implemented method according to claim 4, where the encrypted part of the request structure comprises the third authorization secret.

6. The computer-implemented method according to claim 1, wherein the metadata of the secure guest comprises an extension secret, and the trusted firmware rejects every request that does not contain the extension secret.

7. The computer-implemented method according to claim 1, wherein the secure guest submits the request to the trusted firmware via a direct firmware call, wherein the request structure and all sensitive cryptography requests target the hardware security module.

8. The computer-implemented method according to claim 1, wherein each request to the hardware security module that comprises a hardware security module protected key is a sensitive request.

9. The computer-implemented method according to claim 1, wherein each request that returns a result containing a hardware security module protected key is a sensitive request.

10. The computer-implemented method according to claim 1 wherein the metadata comprises integrity measures of the image.

11. The computer-implemented method according to claim 1, wherein the metadata comprises security measures.

12. The computer-implemented method according to claim 1, further comprising:
    protecting, by the trusted firmware, the third authorization secret against access from any guest and the hypervisor.

13. The computer-implemented method according to claim 1, further comprising, upon providing access to the hardware security module to an untrusted component:
    instructing, by the trusted firmware, the hardware security module to no longer accept keys bound to the third authorization secret.

14. A system for implementing a three-factor authorization in a trusted computing environment, the system comprising:
    one or more processors; and
    a memory operationally coupled to the one or more processors, wherein the memory stores program portions which, when executed, enable the one or more processors to perform a method comprising:
triggering, by a hypervisor, a start of a secure guest by passing control regarding an image of the secure guest and metadata of the secure guest to a trusted firmware, wherein the secure guest is designed to access a hardware security module;
upon a successful integrity check of the metadata of the secure guest by the trusted firmware:
starting the secure guest using the hypervisor, and blocking any sensitive request from the secure guest to the hardware security module;
submitting, by the secure guest, a request comprising a request structure including a third authorization secret and a characterization of a requested hardware security module to the trusted firmware; and
binding, by the trusted firmware, each hardware security module protected key generated in the requested hardware security module in response to the request to the third authorization secret.

15. The system of claim 14, wherein the method further comprises:
unblocking sensitive requests to the requested hardware security module from the secure guest that only operates on at least one of the each hardware security module protected key bound to the third authorization secret.

16. The system of claim 14, wherein the method further comprises:
instructing, by the trusted firmware, the hardware security module to bind each key to be generated to the third authorization secret.

17. The system of claim 14, wherein the request structure is integrity protected and partially encrypted such that only the trusted firmware is enabled to decrypt the encrypted part of the request structure and integrity-check the request.

18. The system of claim 17, where the encrypted part of the request structure comprises the third authorization secret.

19. The system of claim 14, wherein the metadata of the secure guest comprises an extension secret.

20. The system of claim 14, wherein the secure guest submits the request to the trusted firmware via a direct firmware call, wherein the request structure and all sensitive cryptography requests target to the hardware security module.

21. The system of claim 14, wherein each request to the hardware security module that comprises a hardware security module protected key is sensitive.

22. The system of claim 14, wherein each request that returns a result containing a hardware security system protected key is a sensitive request.

23. The system of claim 14, wherein the metadata comprises integrity measures of the image.

24. The system of claim 14, wherein the method further comprises protecting, by the trusted firmware, the third authorization secret against access from any guest and the hypervisor.

25. A computer program product, the computer program product comprising a computer readable storage medium having program instructions embodied therewith, the program instructions executable by a processor to cause a device to perform a method of implementing a three-factor authorization in a trusted computing environment, the method comprising:
triggering, by a hypervisor, a start of a secure guest by passing control regarding an image of the secure guest and metadata of the secure guest to a trusted firmware, wherein the secure guest is designed to access a hardware security module;
upon a successful integrity check of the metadata of the secure guest by the trusted firmware:
starting the secure guest using the hypervisor, and blocking any sensitive request from the secure guest to the hardware security module;
submitting, by the secure guest, a request comprising a request structure including a third authorization secret and a characterization of a requested hardware security module to the trusted firmware; and
binding, by the trusted firmware, each hardware security module protected key generated in the requested hardware security module in response to the request to the third authorization secret.

* * * * *